United States Patent
Omari

Patent Number: 5,173,323
Date of Patent: Dec. 22, 1992

[54] PROCESS FOR REMOVING THE BITTERNESS FROM POTASSIUM CHLORIDE

[76] Inventor: Yunis J. Omari, 2326 39th Ave., San Francisco, Calif. 94116

[21] Appl. No.: 736,454

[22] Filed: Jul. 22, 1991

[51] Int. Cl.$^5$ ................................ A23L 1/30
[52] U.S. Cl. .................................... 426/649
[58] Field of Search ......................... 426/649

[56] References Cited

U.S. PATENT DOCUMENTS

| | | | |
|---|---|---|---|
| 1,978,040 | 10/1934 | Daitz | 426/649 |
| 2,824,008 | 2/1958 | Perri et al. | 426/649 |
| 2,922,697 | 1/1960 | Bell et al. | 426/649 |
| 4,068,006 | 1/1978 | Moritz | 426/649 |
| 4,216,244 | 8/1980 | Allen, Jr. et al. | 426/649 |
| 4,473,595 | 9/1984 | Rood et al. | 426/649 |
| 4,775,546 | 10/1988 | Higurashi et al. | 426/649 |

FOREIGN PATENT DOCUMENTS

| | | | |
|---|---|---|---|
| 59-154958 | 9/1984 | Japan | 426/649 |
| 59-210866 | 11/1984 | Japan | 426/649 |
| 9000522 | 1/1990 | PCT Int'l Appl. | 426/649 |

*Primary Examiner*—Steven Weinstein
*Assistant Examiner*—J. Aberle
*Attorney, Agent, or Firm*—Welsh & Katz, Ltd.

[57] ABSTRACT

The invention disclosed is a process to remove the bitterness from KCl. In this process KCl, up to about 56.7% of the solution, by weight is dissolved in hot drinking water. The pH of the solution is then oscillated and returned to near neutral by either first raising the pH by the addition of an appropriate base, such as potassium hydroxide (KOH) and then lowering the pH to near neutral by the addition of food acids, such as malic acid, fumaric acid, adipic acid, succinic acid, hydrochloric acid or phosphoric acid or, combinations of these acids. Or, first lowering the pH and then raising it to near neutral. The solution is then cooled and the resulting precipitate separated from the solution (solution A). The precipitate is then dissolved in hot drinking water (solution B) and the pH is again raised and lowered as described above. Solution A and solution B are then mixed together (solution C). A compound from the group consisting of the amino acid and their salts, in a minimum amount of 0.2% by weight of the KCl is added to solution C. Solution C is then dried and the resulting crystalline product, treated KCl, (salt A) is ground and screened through US mesh 30-100.

16 Claims, No Drawings

PROCESS FOR REMOVING THE BITTERNESS FROM POTASSIUM CHLORIDE

BACKGROUND OF THE INVENTION

Sodium Chloride (NaCl or common table salt) is a frequently used food additive and seasoning. It is generally known that NaCl can be harmful to the health of human beings, if consumed in excessive amounts or if certain health conditions exist. However, humans prefer food that has been seasoned with NaCl. Therefore, in recent years, as the harmful effects of NaCl have been recognized, attempts have been made to develop substitutes for NaCl that provide the same flavoring benefits without the harmful effects. These substitutes restrict or lower sodium intake.

One of these substitutes is potassium chloride (KCl). One problem with the use of KCl is that it is bitter and has an unpleasant after taste. Therefore, although its use aids in reducing the amount of NaCl consumed, it is an undesirable seasoning for food.

Various methods have been developed to try to alter the taste of KCl. Some of them mask the bitterness while others attempt to remove bitterness from the KCl, by combining it with various other salts and seasoning compounds.

The invention disclosed is a more effective method for removing the bitterness from KCl and for giving the same results regarding saltiness as NaCl. This process provides a product that can be used as a salt seasoning without mixing it with any other compounds. It can however, be mixed with other salts and/or mineral compounds to enable the addition of needed minerals to food, as will be described below.

SUMMARY OF THE INVENTION

A primary object of this invention is to produce a palatable substitute for common table salt, derived from KCl, that provides the "salty" taste of NaCl without the addition of NaCl to the food and which can be used for salting food and can be used in the cooking, baking, frying and flavoring of food.

Another object of this invention is to produce a palatable substitute for common table salt, derived from KCl, that can be mixed with other compounds and salts, if desired, to add minerals, such as magnesium, to food.

The objects of this invention are achieved by a process in which KCl, up to about 56.7% of the solution, by weight is dissolved in hot drinking water. The pH of the solution is then oscillated and returned to near neutral by either first raising the pH by the addition of an appropriate base, such as potassium hydroxide (KOH) and then lowering the pH to near neutral by the addition of food acids, such as malic acid, fumaric acid, adipic acid, succinic acid, hydrochloric acid or phosphoric acid or, combinations of these acids; or, first lowering the pH and then raising it to near neutral. The solution is then cooled and the resulting precipitate separated from the solution (solution A).

The precipitate is then dissolved in hot drinking water (solution B) and the pH is again raised and lowered as described above. Solution A and solution B are then mixed together (solution C). A compound from the group consisting of the amino acids and their salts, in a minimum amount of 0.2% by weight of the KCl is added to solution C.

Solution C is then dried and the resulting crystalline product, treated KCl, (salt A) is ground and screened through US mesh 30–100.

Salt A can also be obtained by variations of the above process as will be discussed below.

Salt A is not bitter and does not have an unpleasant after taste. Salt A can then be mixed with anti-caking agents and can be used alone or mixed with other salts or mineral compounds for the addition of minerals to food.

Mixtures of salt A and NaCl do not lose their homogeneity because both KCl, from which salt A is derived, and NaCl have similar crystal structures. Both belong to cubic system and are close in specific gravity and refractive indices as the following table indicates:

| | SP. GR. | REF IN. | AT. WT. | MOL. WT. | SYNONYMA |
|---|---|---|---|---|---|
| KCl: | 1.984 | 1.94 | 74.5 | 74.5 | Nat. Silvite |
| NaCl: | 2.165 | 1.54 | 58.5 | 58.5 | Nat. Halite |

Since Potassium has a higher atomic weight than sodium, a mixture within a given ratio of NaCl: KCl will have a lower ratio of $NA^+$: $K^+$. This is demonstrated in the following table. Data is percent by weight.

| KCl | NaCl | $Na^+$ | $K^+$ | NaCl:KCl | $Na^+:K^+$ |
|---|---|---|---|---|---|
| — | 100 | 39.32 | — | — | — |
| 100 | — | — | 52.35 | — | — |
| 80 | 20 | 7.86 | 41.87 | 1:4 | 0.188 |
| 90 | 10 | 3.93 | 47.11 | 1:9 | 0.083 |
| 95 | 5 | 1.96 | 49.72 | 1:19 | 0.039 |
| 98 | 2 | 0.76 | 51.29 | 1:49 | 0.015 |

If 10 grams daily of a salt composed of 95% Salt A and 5% NaCl is consumed, then 4.853 grams of potassium and 0.182 grams of Sodium would be ingested. Thus, the relative sodium content is less than 5% of the sodium content in 10 grams of common table salt.

Taste tests were performed comparing food made with 100% salt A, a mixture of salt A and NaCl (95:5% Salt A: Nacl), and 100% NaCl. These tests resulted in findings that support the claims that salt A is not bitter and has a pleasant after taste. These tests and the results thereof are set forth below.

EXAMPLE (1)

Mozzarella Cheese

Mozzarella cheese was made by lowering the pH of milk to 5.3 by adding diluted acid. The milk was then heated and curding substances added. The resulting curd was then cut and the whey drained. The curd was compressed for 2 hours, and then fed with water into a cooker-mixer where it was cooked at 170° F. for 15 minutes. The cooked curds were separated into 15 blocks, each weighing one pound, and cooled in cold water.

The blocks were then divided into 3 groups (5 blocks per group) and coated with 35 grams of salt A, salt A/Nacl mixture and NaCl respectively and placed in a mechanical mold for 24 hours.

The blocks of cheese were then cut into small pieces and placed on pre-numbered trays. Fifteen judges tasted the cheese from the numbered trays. Between each taste of cheese they ate bits of watermelon and cantaloupe to remove the taste of the previous cheese eaten. Each judge was asked to write their comments regarding taste, bitterness and the degree of saltiness of each cheese. Their comments were then collected and the judges were dismissed. (We note that during this taste testing portion, the judges were positioned in a fashion that they could not be influenced by each other).

The judges' sheets were then tallied and the findings are as follows: None of the judges found any of the cheese to be bitter or to have any aftertaste; 9 of the judges could not differentiate the degree of saltiness between the salts used; 5 Judges noted that salt A/NaCl was a little saltier than the others and, 1 judge noted that the cheeses coated with NaCl were saltier than the others.

EXAMPLE 2

Pizza

Pizza was made with sauce, dough and toppings which were prepared in the following manner:

Sauce: The sauce was made by concentrating tomato juice to one third of the original volume through evaporation for 2 hours. Iodate gum Oregano, peppers and garlic powder were then added to the juice. The sauce was then divided into three one liter bowls, and salted with salt A, salt A/salt NaCl mixture and NaCl respectively.

Dough: The dough was prepared by using 6 cups of all purpose flour, instant yeast, one teaspoon of sugar and 1 cup of warm water. The ingredients were divided into three bowls and then 5 grams of salt A, salt A/Nacl mixture and Nacl were added to each bowl respectively. Each bowl of flour mixture was then kneaded until smooth, covered and allowed to raise in a warm place, (approximately one hour).

Toppings: The toppings contained 2 lbs of ground beef which was divided into three equal portions in pre-marked frying pans each containing salad oil and Salt A, Salt A/NaCl mixture and NaCl respectively. The meat was cooked and each meat mixture was then mixed with its corresponding salted, mozzarella cheese.

The pizzas were made, each containing ingredients with the same type of salt.

Fifteen Judges tasted the pizzas as in Example 1. No judge indicated any of the pizzas had a bitter taste or unpleasant after taste; 11 Judges could not differentiate the degree of saltiness; 4 Judges found the Salt A/NaCl mixture to be saltier than the others.

EXAMPLE 3

Canning Green Beans

Green beans were canned by first cleaning and cutting the beans and then cooking them at 180° F. for eight minutes. The beans were then divided into three groups and placed into pre-marked cans. Three separate 20 grams per liter brine solutions were made, one for each group of cans. These solutions contained Salt A, Salt A/NaCl mixture and NaCl respectively.

The cans were closed with a can closure machine and placed in a retort for 36 minutes at 240° F. The cans were then opened a week later and served with fried chicken.

The chicken was made by seasoning it with ginger, black pepper and nutmeg and dividing it into three groups. Each group was salted with 27 grams of Salt A, Salt A/NaCl mixture and NaCl respectively. The chicken was then coated with salted flour containing the same salt as used to season the chicken. The chicken was then fried in pre-marked frying pans.

Twelve Judges taste tested the meal which consisted only of the chicken, green beans and coke (to clean the palate).

None of the Judges indicated any disagreeable bitterness after taste; all twelve indicated that the Salt A/-NaCl salt mixture in the chicken was slightly saltier than the others; none of the Judges differentiated between the saltiness of the green beans.

DESCRIPTION OF THE PREFERRED EMBODIMENT

The process used to obtain salt A can be modified in a number of ways, including variations in the concentration of the original KCl solution; the specific acids and bases used to adjust the pH of the solutions; the exact temperature of the water, the exact pH modifications made to solution A and B; the specific amino acid or amino acid salt added to the solutions; and the timing of the addition of the amino acid or amino acid salt, i.e. it can be added to all three solutions; solution A and solution B; solution B alone; or, solution C alone. Since numerous modifications are possible, these modifications, additions, subtractions, substitutions are considered to be within the meaning and range equivalency of the claims.

However, in the preferred embodiment of the invention, salt A is made by the following process. The KCl is added to hot drinking water at 56.7% of the solution, by weight (solution A). The pH of the solution A is then raised by the addition of potassium hydroxide (KOH). The pH is then returned to near neutral by adding adipic acid. The solution A is then cooled and the resulting precipitate separated from the solution A.

The precipitate is then dissolved in hot drinking water (solution B), and the pH raised by the addition of KOH and then lowered by the addition of adipic acid to near neutral. Solution A and solution B are then mixed together (solution C). 2 grams per 100 grams of KCl of L-lysine mono hydrochloride is added to solution C.

Solution C is then dried and the resulting crystalline product (salt A) is ground and screened through U.S. mesh 30-100.

Other acids can be used to return the pH to near neutral, such as malic acid, fumaric acid, succinic acid, hydrochloric acid or phosphoric acid, or combinations of these acids.

The exact pH to which solutions A and B are raised can be varied, as long as the pH of the solutions are increased and then decreased. Also, rather than raising the pH of the solutions A and B, salt A can also be obtained by first lowering the pH and then raising it to near neutral.

Anti-caking agents, such as tricalcium phosphate, can then added to Salt A, which can be used alone or mixed with other salts (such as NaCl as discussed above), or mineral compounds.

Mineral compounds, such as the magnesium compounds magnesium oxide, magnesium carbonate and magnesium sulfate; calcium compounds or other sodium salts can also be added to Salt A. By varying the exact compound and the percent used, the amount of magnesium or other mineral added to the diet can be adjusted. These mineral compounds can be added to any of the three solutions, during the preparation of salt A or to the final crystalline KCl product.

The following table illustrates how the amount of $Mg^{++}$ and $Na^+$ to salt A can be varied by the use of different magnesium compounds and different percentages of NaCl.

The atomic weight of $Mg=24.3$. The molecular wt. of $MgSo^4.H_2O$ is 246.5; magnesium Oxide 56.31; and, $MgCO_3.3H_2O$ is 138.37. The relative percentage of Mg in Magnesium Sulfate, Magnesium Oxide and Magnesium Carbonate are 9.86, 43.15 and 17.56, respectively.

| ALL DATA PERCENT BY WEIGHT | | | | | | | |
|---|---|---|---|---|---|---|---|
| KCl | NaCl | $MgSo_4.7H_2O$ | $MgCO_3.3H_2O$ | K+ | Na+ | Mg++ | Mg++ |
| 85 | 5 | 10 | — | 44.49 | 1.966 | 0.0986 | — |
| 90 | 5 | 5 | — | 47.11 | 1.966 | 0.493 | — |
| 70 | 20 | 10 | — | 36.64 | 7.864 | 0.986 | — |
| 95 | — | — | 5 | 49.72 | — | — | 0.878 |
| 90 | — | — | 10 | 47.11 | — | — | 0.176 |

Consumption of 10 grams daily, of 85% potassium salt, 5% sodium chloride and 10% magnesium sulfate, would result in the ingestion of 82.2 milligrams of the desirable magnesium dietary intake and 165 milligrams of sodium salt; instead of the intake of 3932 milligrams of sodium in 10 grams of common salt. This salt is considered diotic because the content of sodium is less than the daily allowed intake of sodium.

While certain embodiments of the present invention have been shown and described, it should be understood that various alternatives, substitutions and equivalents can be used, and the present invention should not be limited by the claims and equivalents thereof.

Various features of the present invention are set fourth in the following claims.

What is claimed is:

1. A process for removing the bitterness from potassium chloride comprising the steps of:
   1) dissolving potassium chloride in hot drinking water, up to about approximately 56.7%, by weight, forming a first solution;
   2) oscillating the pH of said first solution;
   3) returning the pH of said first solution to near neutral;
   4) cooling said first solution, thereby causing a precipitate to form;
   5) separating said precipitate from said first solution;
   6) dissolving said precipitate in hot drinking water to form a second solution;
   7) oscillating the pH of said second solution;
   8) returning the pH of said second solution to near neutral;
   9) cooling said second solution;
   10) mixing said first solution and said second solution to form a third solution;
   11) adding 2 grams of a compound from the group consisting of the amino acids and their salts, per 100 grams of potassium chloride to said third solution;
   12) drying said third solution to obtain a crystalline product.

2. A process for removing the bitterness from potassium chloride, as claimed in claim 1, wherein said oscillation of the pH of said first and second solutions consists of the steps of first raising the pH and then lowering the pH to near neutral.

3. A process for removing the bitterness from potassium chloride, as claimed in claim 2, wherein the pH of said first and second solutions is raised by the addition of potassium hydroxide.

4. A process for removing the bitterness from potassium chloride, as claimed in claim 2, wherein the pH of said first and second solutions is lowered by the addition of an acid from the group consisting of malic acid, fumaric acid, adipic acid, succinic acid, hydrochloric acid or phosphoric acid. 11 11 4

5. A process for removing the bitterness from potassium chloride, as claimed in claim 1, wherein said oscillation of the pH of said first and second solutions consists of the steps of first lowering and then raising the pH to near neutral.

6. A process for removing the bitterness from potassium chloride, as claimed in claim 5, wherein the pH of said first and second solutions is raised by the addition of potassium hydroxide.

7. A process for removing the bitterness from potassium chloride, as claimed in claim 5, wherein the pH of said first and second solutions is lowered by the addition of an acid from the group consisting of malic acid, fumaric acid, adipic acid, succinic acid, hydrochloric acid or phosphoric acid.

8. A process for removing the bitterness from potassium chloride, as claimed in claim 5, wherein the amino acid or amino acid salt added to said third solution is L-lysine mono hydrochloride.

9. A process for removing for removing the bitterness from potassium chloride comprising the steps of:
   dissolving potassium chloride, up to about 57% by weight in hot drinking water to form a first solution, then, oscillating the pH of said first solution; followed by returning the pH of said first solution to near neutral and then cooling said first solution, thereby causing a precipitate to form; then, separating said precipitate from said first solution; and, dissolving said precipitate in hot drinking water to form a second solution; then, oscillating the pH of said second solution followed by returning the pH to of said second solution to near neutral; and cooling said second solution; then, mixing said first solution and said second solution to form a third solution; and adding 2 grams of a compound from the group consisting of the amino acids and their salts, per 100 grams of potassium chloride, to one of the solutions from the group consisting of said first and said second solution; said second solution; or, said third solution; then drying said third solution to obtain a crystalline product.

10. A process for removing the bitterness from potassium cloride, as claimed in claim 9, wherein said oscillation of the pH consists of the steps of first raising the pH and then lowering it to near neutral.

11. A process for removing the bitterness from potassium chloride, as claimed in claim 10, wherein the pH of said first and second solutions are lowered by the addition of an acid from the group consisting of malic acid, fumaric, adipic acid, succinic acid, hydrochloric acid or phosphoric acid.

12. A process for removing the bitterness from potassium chloride, as claimed in claim 10, wherein the pH of said first and second solutions are raised by the addition of potassium hydroxide.

13. A process for removing the bitterness from potassium chloride, as claimed in claim 9, wherein said oscillation of the pH consists of the steps of first lowering the pH and then raising it to near neutral.

14. A process for removing the bitterness from potassium chloride, as claimed in claim 13, wherein the pH of said first and second solutions are lowered by the addition of an acid from the group consisting of malic acid, fumaric acid, adipic acid, succinic acid, hydrochloric acid or phosphoric acid.

15. A process for removing the bitterness from potassium chloride, as claimed in claim 13, wherein the pH of said first and second solutions are raised by the addition of potassium hydroxide.

16. A process for removing the bitterness from potassium chloride, as claimed in claim 9 wherein the amino acid or amino acid salt added to one of the solutions from the group consisting of said first and said second solutions; said second solution or said third solution is L-lysine mono hydrochloride.

* * * * *

UNITED STATES PATENT AND TRADEMARK OFFICE
CERTIFICATE OF CORRECTION

PATENT NO. : 5,173,323

DATED : December 22, 1992

INVENTOR(S) : Yunis (John) Omari

It is certified that error appears in the above-identified patent and that said Letters Patent is hereby corrected as shown below:

On the Title page, item,

[76] Inventor: Yunis J. Omair should read -- Yunis (John) Omari

Signed and Sealed this

Seventeenth Day of August, 1993

Attest:

BRUCE LEHMAN

Attesting Officer  Commissioner of Patents and Trademarks